US009139393B2

(12) United States Patent  
Hanson et al.

(10) Patent No.: US 9,139,393 B2  
(45) Date of Patent: Sep. 22, 2015

(54) ROLL STAND ASSEMBLY

(71) Applicant: Processing Technologies International, LLC, Aurora, IL (US)

(72) Inventors: Dana R. Hanson, St. Charles, IL (US); Mitchell L. Gritzner, Montgomery, IL (US)

(73) Assignee: Processing Technologies International, LLC, Aurora, IL (US)

(*) Notice: Subject to any disclaimer, the term of this patent is extended or adjusted under 35 U.S.C. 154(b) by 479 days.

(21) Appl. No.: 13/681,608

(22) Filed: Nov. 20, 2012

(65) Prior Publication Data

US 2014/0138472 A1 May 22, 2014

(51) Int. Cl.
| | |
|---|---|
| *B65H 20/02* | (2006.01) |
| *B65H 26/00* | (2006.01) |
| *F16P 1/00* | (2006.01) |
| *B65H 16/02* | (2006.01) |
| *B29C 47/00* | (2006.01) |
| *B65H 16/00* | (2006.01) |

(52) U.S. Cl.
CPC ............. *B65H 16/021* (2013.01); *B65H 20/02* (2013.01); *B65H 26/00* (2013.01); *F16P 1/005* (2013.01); *B29C 47/004* (2013.01); *B29C 47/0021* (2013.01); *B65H 16/00* (2013.01); *B65H 2407/11* (2013.01)

(58) Field of Classification Search
CPC ........ B65H 20/02; B65H 20/04; B65H 26/00; B65H 63/00; B65H 2407/10; B65H 2407/11; B29C 47/0021; B29C 47/004; F16P 1/00; F16P 1/005; F16P 3/00; F16P 3/001; B21B 33/00

See application file for complete search history.

(56) References Cited

U.S. PATENT DOCUMENTS

| | | | | |
|---|---|---|---|---|
| 2006/0134258 | A1* | 6/2006 | Hanson ......................... | 425/327 |
| 2008/0314525 | A1* | 12/2008 | Hanson et al. ................ | 156/501 |
| 2010/0038037 | A1* | 2/2010 | Hanson et al. ................ | 156/391 |
| 2010/0300171 | A1* | 12/2010 | Hanson et al. ................. | 72/256 |
| 2010/0301507 | A1* | 12/2010 | Hanson et al. ................... | 264/39 |
| 2010/0301513 | A1* | 12/2010 | Hanson et al. ............... | 264/129 |
| 2010/0303943 | A1* | 12/2010 | Hanson et al. ............... | 425/114 |
| 2014/0166846 | A1* | 6/2014 | Hanson et al. ............... | 248/672 |

* cited by examiner

*Primary Examiner* — William E Dondero  
(74) *Attorney, Agent, or Firm* — Wood, Philips, Katz, Clark & Mortimer

(57) ABSTRACT

A roll stand assembly for processing a sheet product with a plurality of rolls on a frame. A first roll has a first sheet engaging surface and a first shaft assembly. A second roll has a second sheet engaging surface and a second shaft assembly. The first and second rolls are relatively movable between: a) an operating relationship; and b) an open relationship. A safety assembly prevents inadvertent changing of the first and second rolls from the open relationship into the operating relationship. The safety assembly includes a first chuck component mounted for movement relative to the frame between: a) a running position wherein the safety assembly is in a disengaged state; and b) a lockout position.

24 Claims, 11 Drawing Sheets

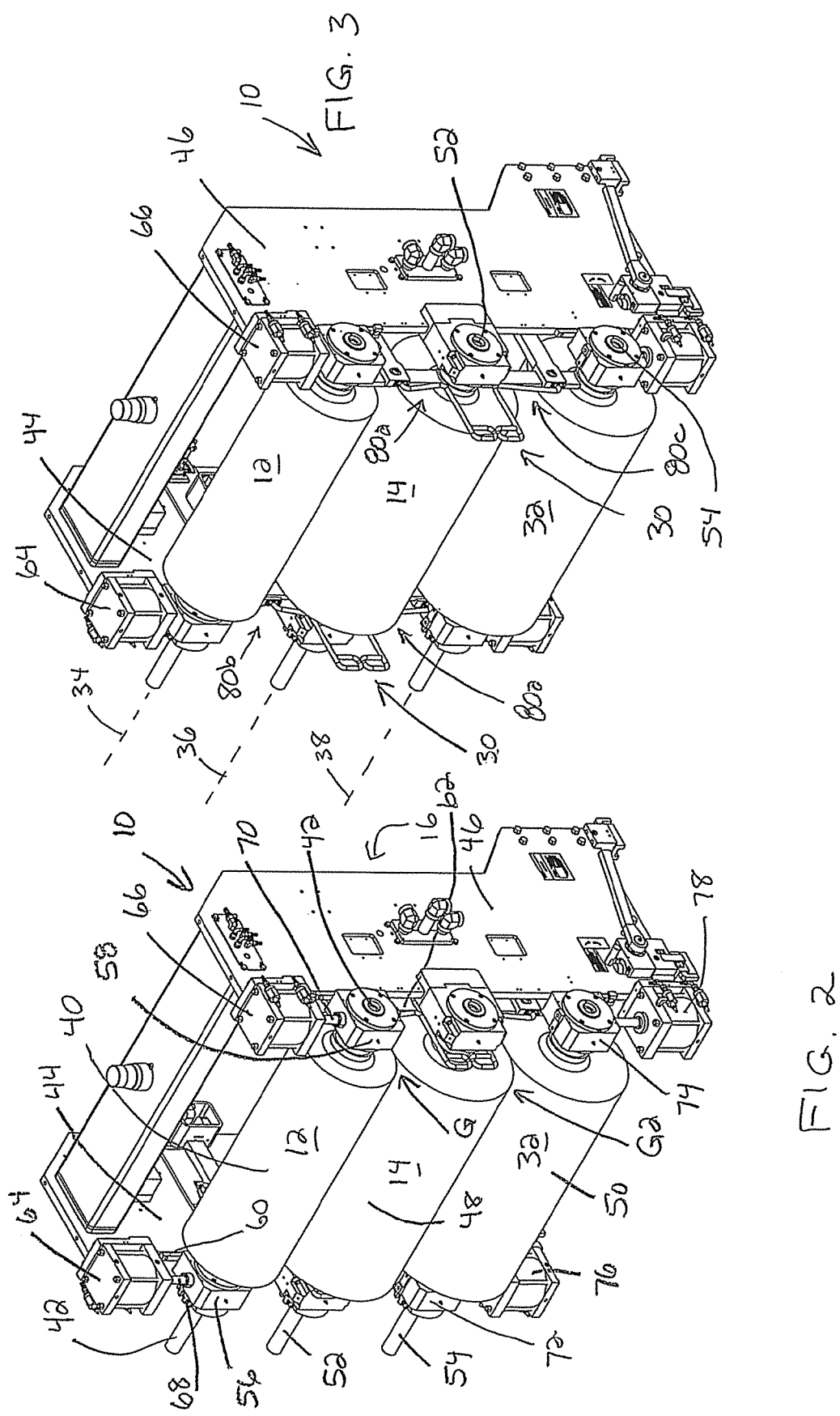

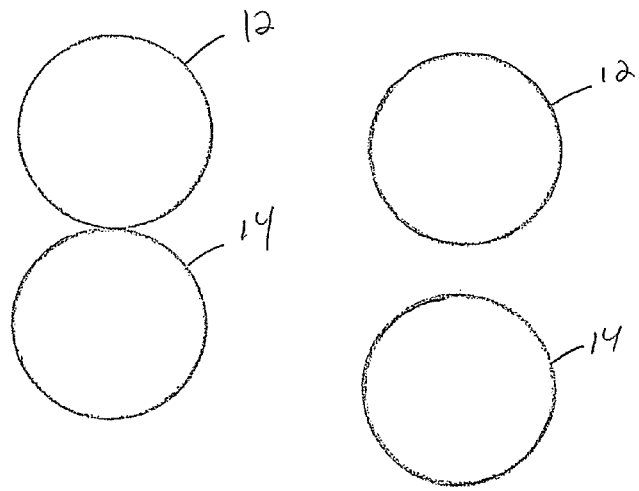
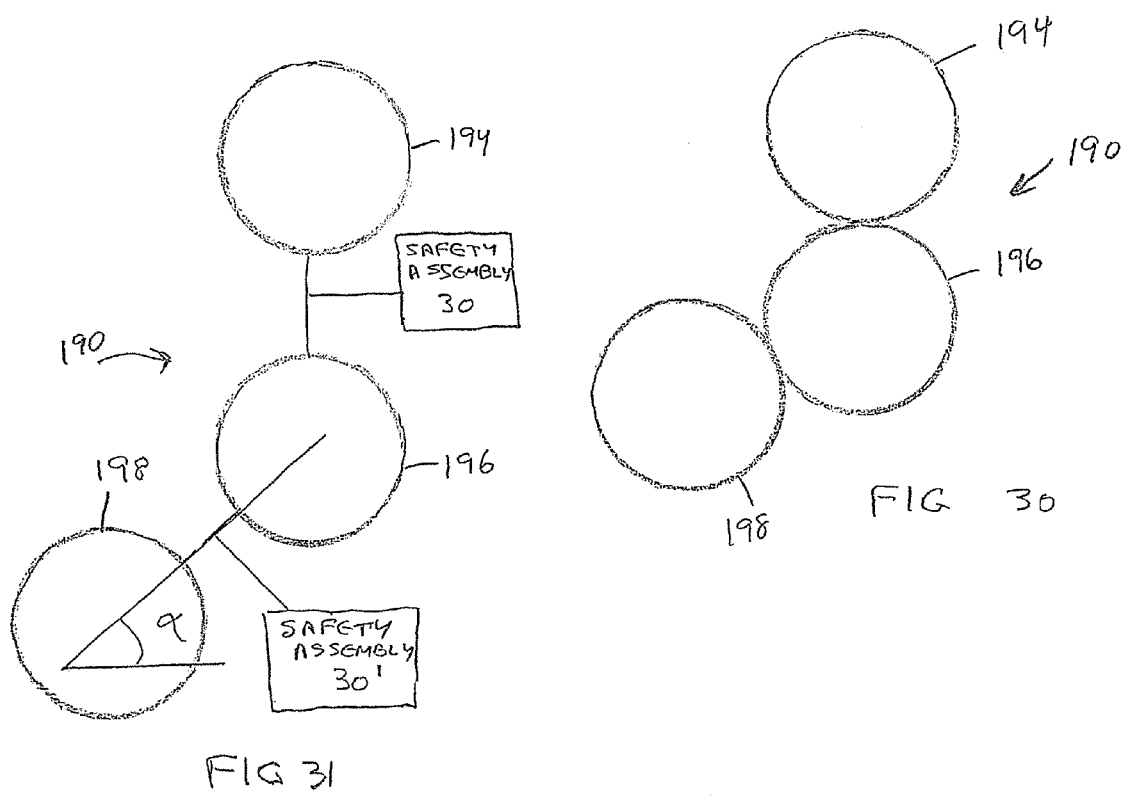

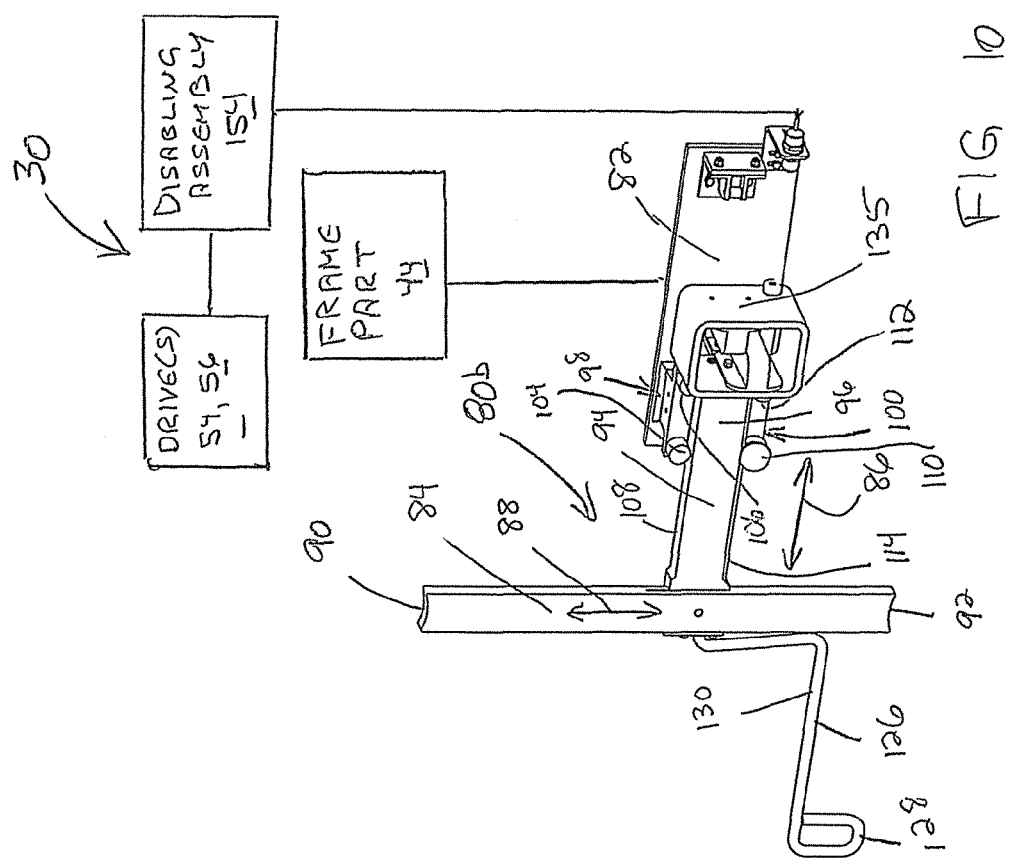
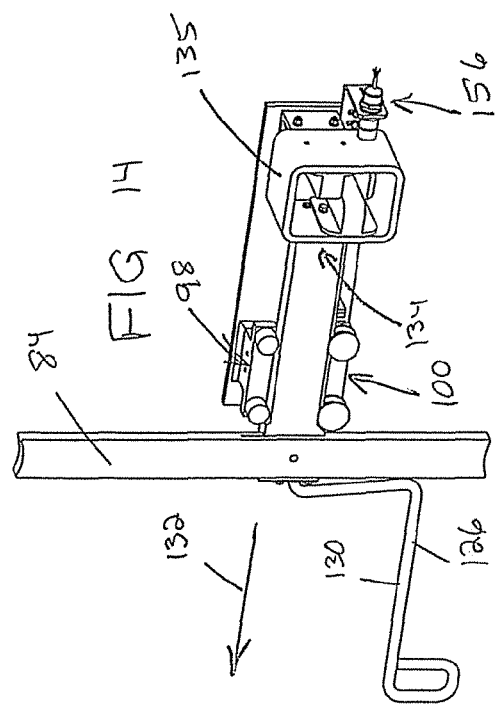

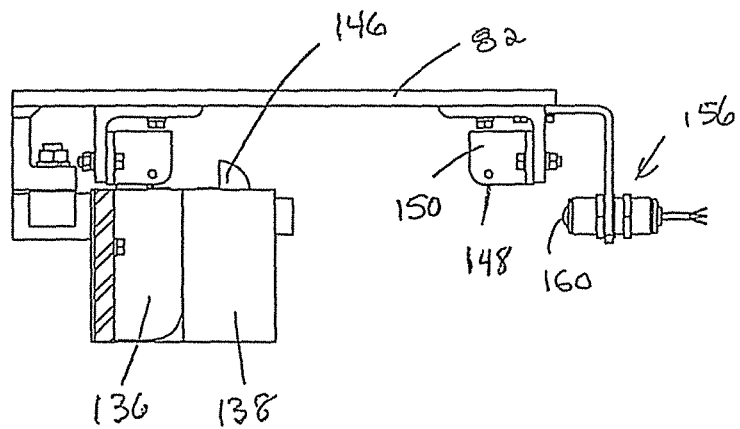
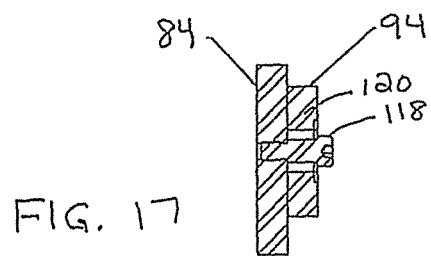

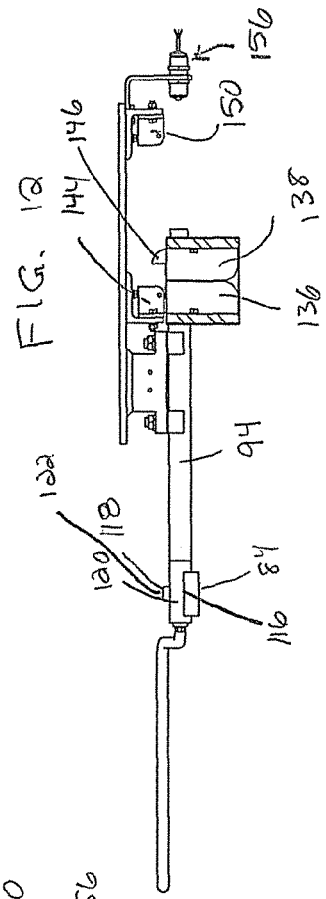
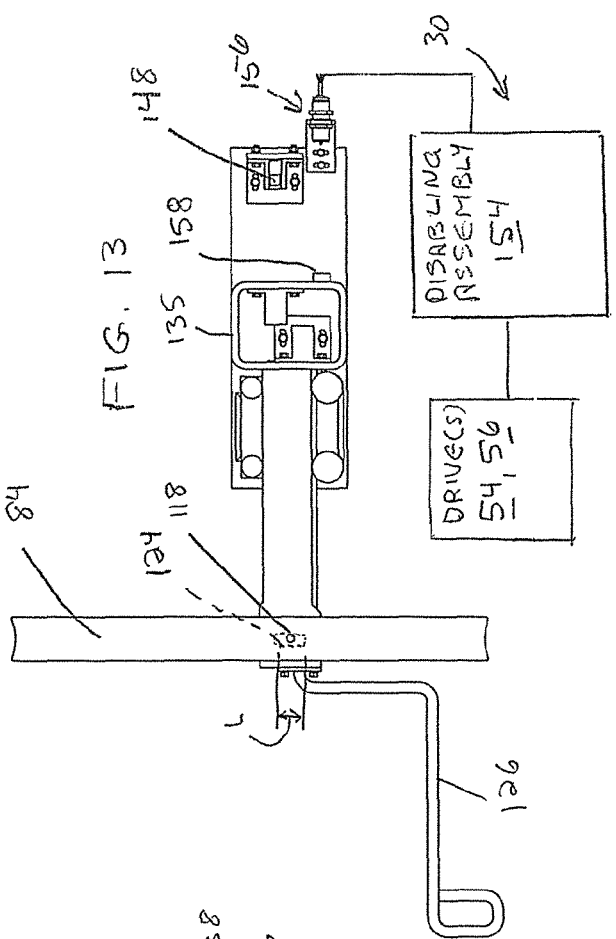
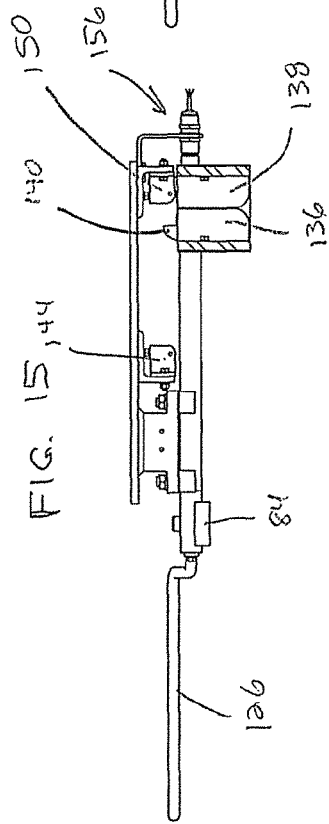
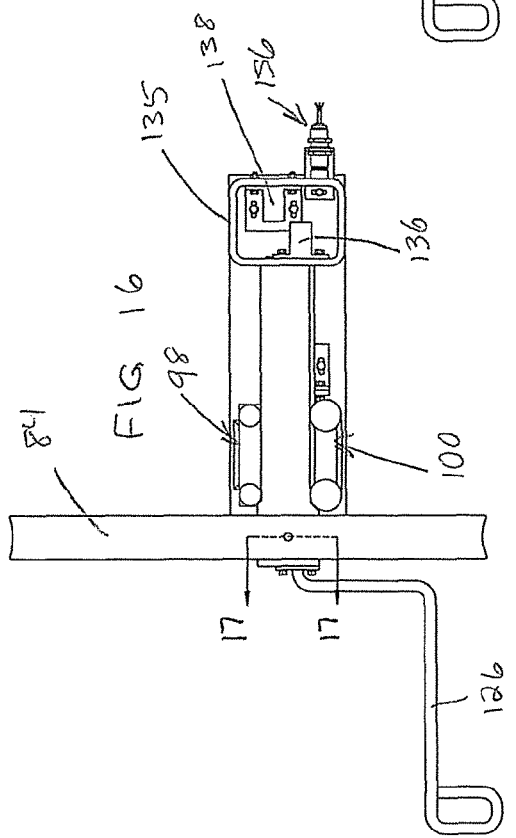

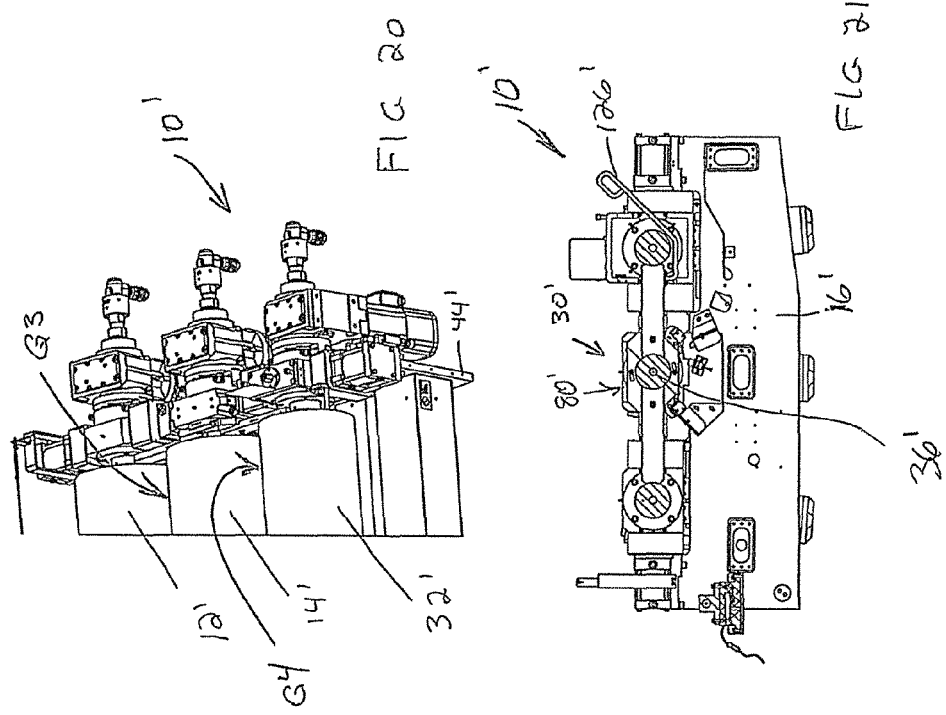
FIG. 20
FIG. 21
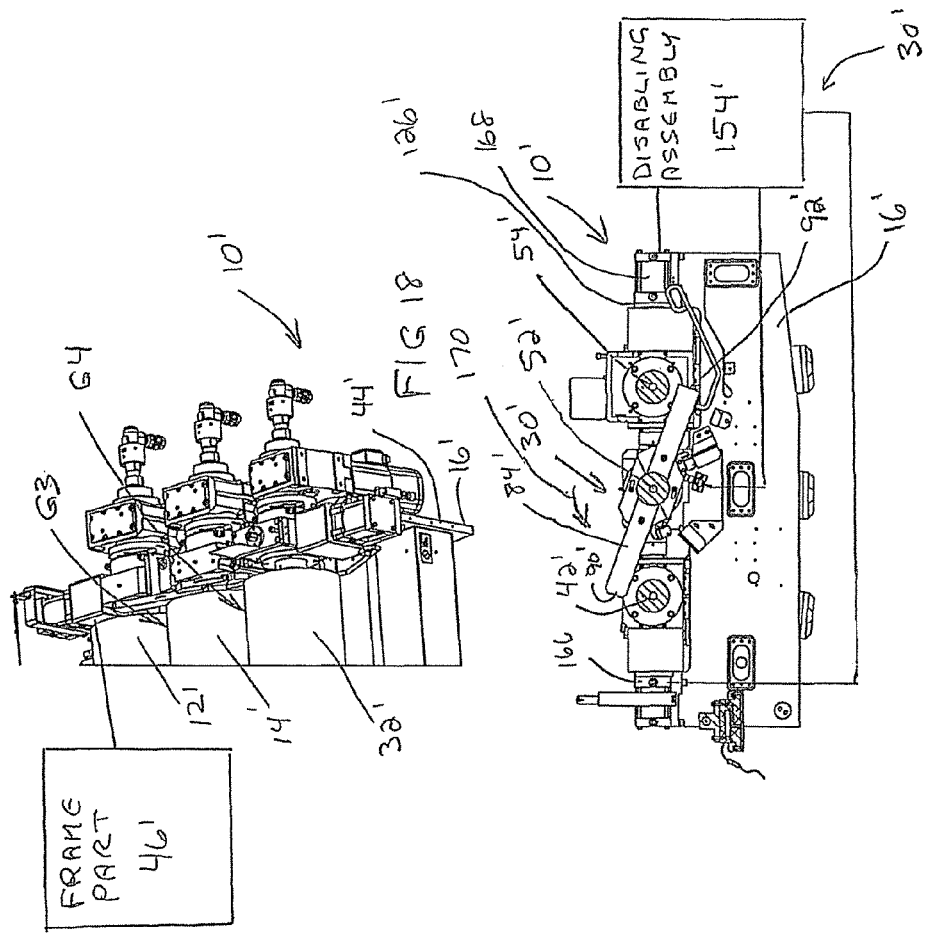
FIG. 18
FIG. 19

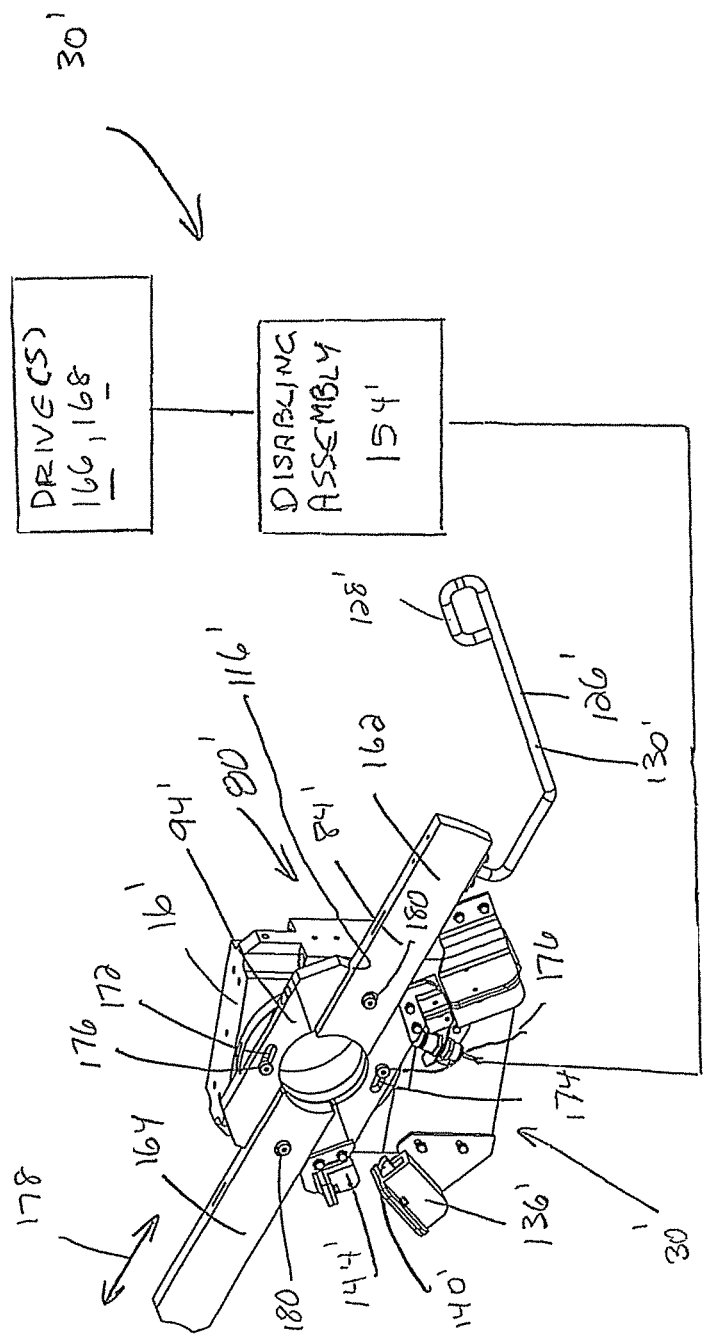

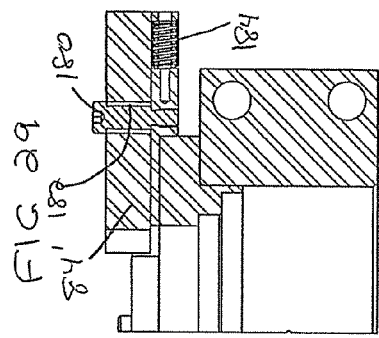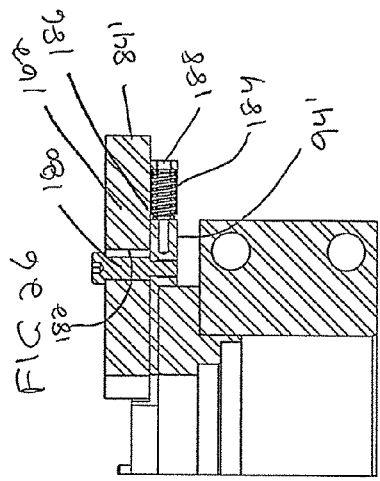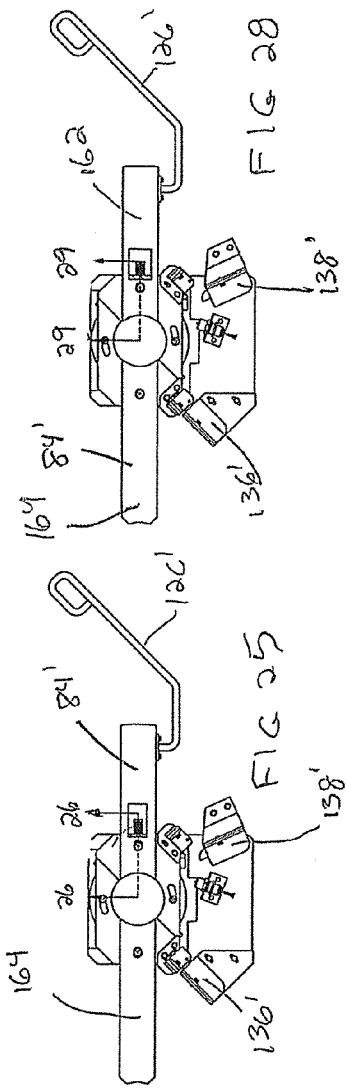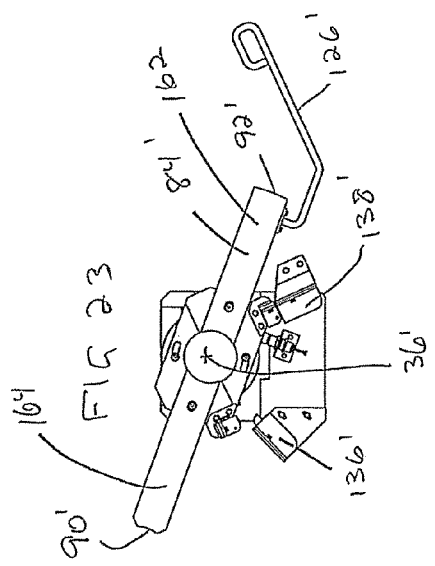

US 9,139,393 B2

ROLL STAND ASSEMBLY

BACKGROUND OF THE INVENTION

1. Field of the Invention

This invention relates to roll stand assemblies as used to form and handle sheet materials and, more particularly, to a roll stand assembly incorporating a safety assembly to maintain a gap between adjacent rolls.

2. Background Art

A multitude of roll stand assemblies currently exists to facilitate sheet formation, processing, and handling. During extrusion sheet formation, a flowable mold material is introduced at a nip location between adjacent rolls which, in addition to forming a sheet configuration, effect advancement thereof to a downstream location for further processing, joinder with other components, etc., preparatory to eventual accumulation of a final product at a point of use. There are virtually an endless number of processing, formation, and handling structures devised for such sheets. Typical of all such roll stand assemblies is the utilization of cooperating rolls that are mounted on a frame for rotation about parallel axes. Adjacent rolls have sheet engaging surfaces that cooperate throughout the manufacturing and sheet handling processes. As the processes are carried out, the cooperating rolls, in an operative state, have a predetermined gap therebetween, which is relatively small, as dictated by the particular process being carried out.

Components on roll stand assemblies typically require regular maintenance and adjustment and periodic repair. Such activities may require that the operating gap between cooperating rolls be increased so that an individual can direct his/her hand between the rolls to access certain operating components.

The gaps are typically controlled by actuating hydraulic drive components. A central controller will generally allow programming that permits an operator to selectively vary the roll gap as required. Typically, the operator will set the cooperating rolls in an open relationship to allow access therebetween. The operator relies upon the functioning of the drives to maintain the open relationship between the rolls.

Rolls on extrusion forming equipment are heavy. There always exists a possibility that under the weight of the rolls, the gap therebetween that is set with the open relationship may partially or fully close by reason of a failure of the hydraulic drives, a failure of a supporting component, or an inadvertent activation of the drives. If any of these events occur, there is a significant risk of operator injury.

Heretofore, the industry has relied primarily on the reliable performance of such drives and the controllers therefor to avoid an unintended closing of the gap between adjacent rolls in the open relationship therefor. The industry is devoid of any effective safety assemblies to prevent such occurrences. It is believed that the lack of such safety assemblies is attributable to the fact that no viable commercial design has been devised that is both effective, easy to operate, and minimally obtrusive in terms of taking up valuable space in and around the working components of the roll stand assembly.

SUMMARY OF THE INVENTION

In one form, the invention is directed to a roll stand assembly for processing a sheet product. The roll stand assembly includes a frame and a plurality of rolls on the frame including first and second rolls respectively having first and second axes. The first and second axes are substantially parallel with the first and second rolls operatively positioned on the frame. The first roll has a first sheet engaging surface and a first shaft assembly projecting axially from the first sheet engaging surface. The second roll has a second sheet engaging surface and a second shaft assembly projecting axially from the second sheet engaging surface. The first and second rolls are relatively movable between: a) an operating relationship wherein there is a gap within a first dimensional range between the first and second sheet engaging surfaces with the roll stand assembly in an operative state; and b) an open relationship wherein the gap dimension is outside of the first dimensional range so as to permit access by an operator through the gap to between the first and second rolls. A safety assembly prevents inadvertent changing of the first and second rolls from the open relationship into the operating relationship. The safety assembly includes a first chuck component mounted for movement relative to the frame between: a) a running position wherein the safety assembly is in a disengaged state and the first and second rolls can be relatively repositioned from the open relationship into the operating relationship; and b) a lockout position wherein the safety assembly is in an engaged state and the first chuck component resides between parts of the first and second rolls and prevents relative movement between the first and second rolls in a manner that would allow the first and second rolls to be changed from the open relationship into the operating relationship.

In one form, the first chuck component resides between parts of the first and second shaft assemblies.

In one form, the first chuck component is translated relative to the frame in a substantially straight line as the first chuck component is changed between the running and lockout positions.

In one form, the first chuck component is pivoted relative to the frame as the first chuck component is changed between the running and lockout positions.

In one form, the first chuck component is in the form of an elongate, generally flat bar with a length and first and second ends spaced in a lengthwise direction. The first and second ends are located respectively at or adjacent the first and second shaft assemblies with the first chuck component in the lockout position.

In one form, the roll stand assembly includes a drive for changing the first and second rolls between the operating and open relationship and the safety assembly includes a disabling assembly for preventing the drive from changing the first and second rolls from the open relationship into the operating relationship as an incident of the first chuck component being moved from the running position toward the lockout position.

In one form, the disabling assembly includes a switch assembly that is changeable between on and off states. The switch assembly is changeable from the off state into the on state as an incident of the first chuck component moving from the lockout position into the running position to thereby allow the drive to change the first and second rolls from the open relationship into the operating relationship. The switch assembly is changeable from the on state into the off state as an incident of the first chuck component moving from the running position towards the lockout position to thereby prevent the drive from changing the first and second rolls from the open relationship into the operating relationship.

In one form, the safety assembly includes a first base on the frame and a first carrier that is movable guidingly relative to the first base to change the first chuck component between the running and lockout positions.

In one form, the first chuck component has a length and first and second ends spaced in a lengthwise direction along a first line. The first and second ends are located respectively at or adjacent the first and second shaft assemblies with the first chuck component in the lockout position.

In one form, the first carrier is movable in a substantially linear path guidingly relative to the first base as the first chuck component is changed between the running and lockout positions.

In one form, the substantially linear path of the first carrier is substantially orthogonal to the first line.

In one form, the first chuck component is movable relative to the carrier along the first line in a discrete range.

In one form, the first end of the first chuck component has an arcuate surface to engage a complementarily-shaped surface on one of the first and second shaft assemblies with the first chuck component in the lockout position.

In one form, the safety assembly further includes a graspable handle on the carrier through which the carrier can be manually moved relative to the base to change the first chuck component between the running and lockout positions.

In one form, the graspable handle is provided on an elongate arm that projects in cantilever fashion from the carrier.

In one form, the safety assembly includes a carrier that is mounted to one of the shaft assemblies and pivots about an axis that is parallel to the axis of the one of the shaft assemblies as the first chuck component is changed between the running and lockout positions. The first chuck component is mounted to the carrier.

In one form, the first chuck component includes first and second parts together having a length between first and second spaced ends that respectively reside at or adjacent the first and second shaft assemblies with the first chuck component in the lockout position.

In one form, the plurality of rolls includes a third roll with a third axis and a third sheet engaging surface. The second and third rolls are relatively movable between: a) an operating relationship wherein there is a second gap within a second dimensional range between the second and third sheet-engaging surfaces with the roll stand assembly in an operative state; and b) an open relationship wherein the second gap dimension is outside of the second dimensional range so as to permit access through the second gap to between the second and third rolls. There is a second chuck component that cooperates between the second and third rolls in substantially the same manner that the first chuck component cooperates between the first and second rolls.

In one form, the frame includes first and second parts between which the first and second rolls span and upon which the first and second rolls are supported and the first chuck component is mounted to one of the first and second frame parts.

In one form, there is a second chuck component on the other of the first and second frame parts that cooperates with the first and second rolls in substantially the same manner that the first chuck component cooperates between the first and second rolls.

In one form, the safety assembly has cooperating latch components that releasably maintain the first chuck component in the running and/or lockout position.

In one form, the invention is directed to a method of configuring a roll stand. The method includes the steps of: providing a roll stand assembly as described above; providing a drive on the roll stand assembly; through the drive, changing the first and second rolls from the operating relationship into the open relationship; and with the first and second rolls in the open relationship, changing the first chuck component from the running position into the lockout position.

In one form, the step of changing the position of the first chuck component involves manually changing the position of the first chuck component and as an incident thereof disabling the drive.

BRIEF DESCRIPTION OF THE DRAWINGS

FIG. 2 is a perspective view of one specific form of the inventive roll stand assembly, as shown in FIG. 1, and with chuck components on separate safety assembly units, that are part of the safety assembly, in running positions;

FIG. 3 is a view as in FIG. 2 wherein the chuck components are in lockout positions;

FIG. 8 is a schematic, side elevation view of paired rolls with which at least one of the inventive safety assembly units is utilized and with the rolls in an operating relationship;

FIG. 9 is a view as in FIG. 8 wherein the rolls are in an open relationship which permits placement of a chuck component on a safety assembly unit in a lockout position;

FIG. 10 is an enlarged, perspective view of the inventive safety assembly including one safety assembly unit and with the chuck component thereon in a lockout position;

FIG. 11 is a fragmentary, plan view of a latching system on the safety assembly unit in the FIG. 10 state;

FIG. 12 is a plan view of the safety assembly unit in the FIG. 10 state;

FIG. 13 is a side elevation view of the safety assembly unit in the FIG. 10 state;

FIG. 14 is a view as in FIG. 10 wherein the chuck component is in a running position;

FIG. 15 is a plan view of the safety assembly unit in the FIG. 14 state;

FIG. 16 is a side elevation view of the safety assembly unit in the FIG. 14 state;

FIG. 17 is an enlarged, cross-sectional view of the safety assembly unit taken along line 17-17 of FIG. 16;

FIG. 18 is a fragmentary, perspective view of another form of roll stand assembly with the inventive safety assembly incorporated and with another form of safety assembly unit on the safety assembly having a chuck component shown in a running position;

FIG. 19 is a side elevation view of the part of the roll stand assembly in FIG. 18 with the chuck component on the safety assembly unit in a running position;

FIG. 20 is a view as in FIG. 18 wherein the chuck component is in a lockout position;

FIG. 21 is a view as in FIG. 19 wherein the chuck component is in the lockout position;

FIG. 22 is an enlarged, perspective view of the inventive safety assembly with the safety assembly unit shown in FIGS. 18-21 and with the chuck component thereon in the running position;

FIG. 23 is a side elevation view of the safety assembly unit in FIG. 22;

FIG. 25 is a view as in FIG. 23 wherein the chuck component is in a lockout position;

FIG. 26 is a further enlarged, cross-sectional view of the safety assembly unit taken along lines 26-26 of FIG. 25;

FIG. 28 is a view as in FIG. 25 wherein the chuck component has been shifted under a spring force to a centered position;

FIG. 29 is a view as in FIG. 26 taken along line 29-29 of FIG. 28;

FIG. 30 is a schematic, side elevation view of three rolls making up a "J" stack and with the rolls in an operating relationship;

FIG. 31 is a view as in FIG. 30 with the rolls in a spaced relationship and showing safety assembly units in schematic form associated therewith.

DETAILED DESCRIPTION OF THE PREFERRED EMBODIMENT

Figure 1:
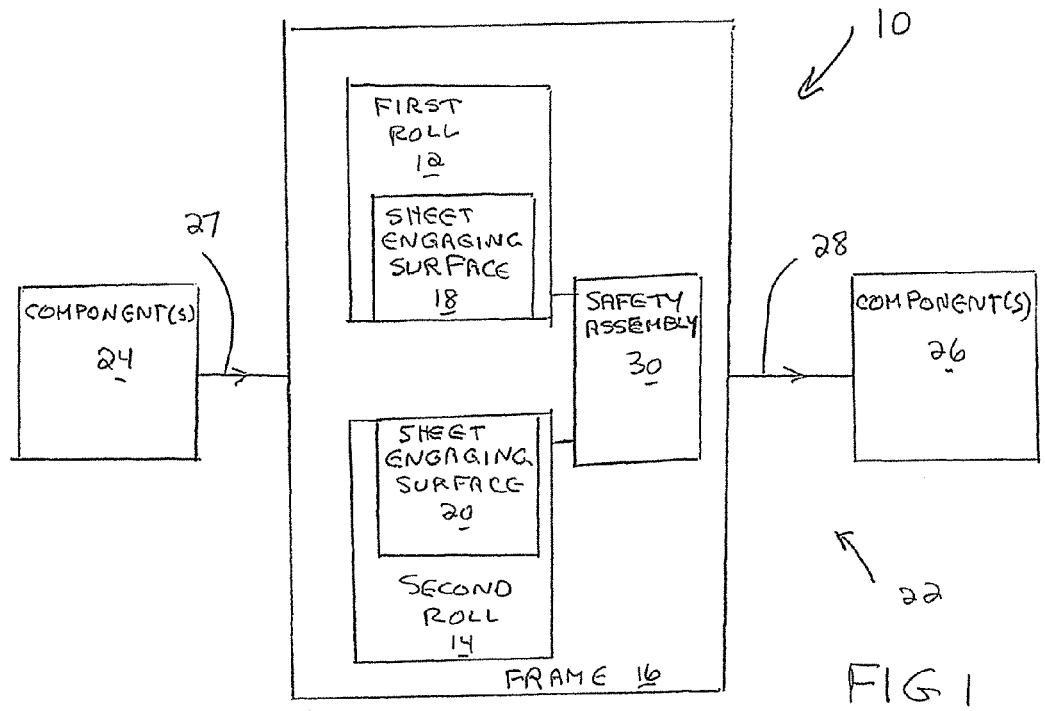
FIG. 1 is a schematic representation of a roll stand assembly including first and second paired rolls with a safety assembly, according to the present invention, incorporated therein, and with the roll stand assembly shown as part of a sheet forming/handling system with additional components.

In FIG. 1, there is a schematic showing of the inventive roll stand assembly at 10. The roll stand assembly 10 has at least first and second cooperating rolls 12, 14, respectively. The rolls 12, 14 are mounted upon a frame 16 for rotation about substantially parallel axes. The rolls 12, 14 have sheet engaging surfaces 18, 20 that cooperate during the sheet formation/handling process.

The roll stand assembly 10 may be a stand-alone unit or may be part of a system, shown at 22, with one or more upstream components 24 and one or more downstream components 26. The upstream components 24 may direct a moldable material or a sheet product 27 to the roll stand assembly 10 with a sheet product 28 directed from the roll stand assembly 10 to the downstream component(s) 26.

The schematic showing of the roll stand assembly 10 and overall system 22 is made to encompass any roll stand assembly construction, used alone or as part of any system, in which there are cooperating rolls between which there is a variable gap. The precise details of construction of the roll stand assembly 10 are not critical to the present invention. The inventive aspect is the incorporation of the safety assembly 30 that cooperates between the rolls 12, 14 to avoid inadvertent closing of a gap, as while an operator is positioned with his/her limb(s) directed therebetween. The precise details of the safety assembly 30 are likewise not critical to the present invention, which is why the same is shown schematically in FIG. 1. There are unlimited different designs that might be devised according to the invention.

An exemplary roll stand assembly 10, according to the present invention, is shown in FIGS. 2-17, without regard to any other components that may make up the overall system into which the roll stand assembly 10 is incorporated. The roll stand assembly 10 may, of course, be a stand-alone unit.

The roll stand assembly 10 consists of the aforementioned frame 16 upon which the first and second rolls 12, 14, and a third roll 32 are operatively positioned. The first, second, and third rolls 12, 14, 32 have operating axes 34, 36, 38, successively. The exemplary first roll 12 has a sheet engaging surface 40 and a shaft assembly 42 projecting axially oppositely from the sheet engaging surface 40. The shaft assembly 42 spans between spaced frame parts 44, 46 and is supported thereby for rotation around the axis 34. The rolls 14, 32 have corresponding sheet engaging surfaces 48, 50 and shaft assemblies 52, 54. The shaft assemblies 42, 52, 54 support the rolls 12, 14, 32 so that the axes 34, 36, 38 are substantially parallel to each other with the rolls 12, 14, 32 operatively positioned on the frame 16.

The roll 12 is supported on the frame parts 44, 46 by like blocks 56, 58 at axially opposite ends of the shaft assembly 42. The block 56 moves in a track 60 on the frame part 44, with the block 58 moving in a like track 62 on the frame part 46. Hydraulic drives 64, 66 are fixed at the frame parts 44, 46, respectively, and have extendable rods 68, 70 engaging the blocks 56, 58. By selectively extending and retracting the rods 68, 70 in the same manner, the blocks 56, 58, and the roll 12 thereon, can be raised and lowered relative to the roll 14 to control the dimensions of a gap G between the sheet engaging surfaces 40, 48 thereon.

The first and second rolls 12, 14 are relatively movable between: a) an operating relationship, as shown in FIGS. 2, 4, 5, and 8; and b) an open relationship, as shown in FIGS. 3, 6, 7, and 9. With the rolls 12, 14 in the operating relationship, the gap G between the exemplary sheet engaging surfaces 40, 48 is within a first dimensional range dictated by the nature of the sheet material being formed/processed, the operation being performed, and the thickness of the sheet material. With the rolls 12, 14 in the open relationship, the gap dimension is outside of this first dimensional range, as to permit access by an operator through the gap G to between the first and second rolls 12, 14.

The third roll 32 is mounted to the frame 16 in the same manner as the roll 12, through blocks 72, 74. Through operation of drives 76, 78, corresponding to the drives 64, 66, the dimension of a gap G2 between the sheet engaging surfaces 48, 50 on the second and third rolls 14, 32 can be changed in the same manner as the dimension of the gap G.

The safety assembly 30 is incorporated to prevent inadvertent changing of the paired first and second rolls 12, 14 and second and third rolls 14, 32 from their open relationship into their operating relationship. The safety assembly 30 consists of separate safety assembly units 80a, 80b, 80c, 80d. Safety assembly units 80a, 80b are used at the axial opposite ends of the paired rolls 12, 14, with safety assembly units 80c, 80d used similarly at the axial opposite ends of the paired second and third rolls 14, 32. It is not required that safety assembly units be provided at both of the axial ends of the paired rolls, nor is it required that all roll pairs be provided with a safety assembly unit.

Details of the exemplary safety assembly unit 80b will now be described, with it being understood that the safety assembly units 80a, 80c, 80d have substantially the same structure and function in substantially the same way at their respective locations between their respective rolls.

The safety assembly unit 80b has a base 82 that is attached to the frame part 44. The base 82 could be eliminated and the components described hereinbelow attached directly to the frame part 44. A chuck component 84 is mounted for movement relative to the base 82 between a running position, as shown in FIGS. 2, 4, 5, and 14-16, and a lockout position, as shown in FIGS. 3, 6, 7, 10, 12 and 13. With the chuck component 84 in the running position, the safety assembly unit 80b is in a disengaged state and the first and second rolls 12, 14 can be relatively repositioned from their open relationship into their operating relationship. With the safety assembly unit 80b in the lockout position, the safety assembly unit 80b is in an engaged state, with the first chuck component 84 residing between parts of the first and second rolls 12, 14, to thereby prevent relative movement between the first and second rolls 12, 14 in a manner that would allow the first and second rolls 12, 14 to be changed from their open relationship into their operating relationship.

The invention contemplates, within the broad generic showing in FIG. 1, that the chuck component 84 may be interposed between any two parts of the rolls 12, 14. In the preferred embodiment, the chuck component 84 is interposed between the shaft assemblies 42, 52 on the first and second rolls 12, 14, respectively.

The chuck component 84 is translated relative to the frame part 44 on the frame 16 in a substantially straight line, as indicated by the double-headed arrow 86, as the chuck component 84 is changed between running and lockout positions. In this embodiment, the chuck component 84 is in the form of an elongate, generally flat, bar with a length along a first line, as indicated by the double-headed arrow 88 between spaced ends 90, 92. The ends 90, 92 have an arcuate shape that each nominally matches the contour of the shaft assembly 42, 45 to which the ends 90, 92 respectively abut, or are in close proximity to, with the chuck component 84 in its lockout position.

The chuck component 84 is supported on a carrier 94. The carrier 94 has an elongate body 96 with a length that is substantially orthogonal to the length of the chuck component 84 so that the body 96 and chuck component 84 cooperatively define a "T" shape.

The body 96 is guided in translation by upper and lower guide assemblies 98, 100 on the base 82. The guide assembly 98 has a pair of rollers 104, 106 that cooperate with an upper rail 108 on the body 96. Similar rollers 110, 112 cooperate with a rail 114 at the bottom of the body 96. The body 96 is thus captive between the rollers 104, 106 and 110, 112 and is guided in translation thereby in the line of the double-headed arrow 86 to change the chuck component 84 between its running and lockout positions. The linear path of the carrier 94, and the chuck component 84 thereon, is substantially orthogonal to the first line between the ends 90, 92, as indicated by the arrow 88.

The chuck component 84 is movable guidingly relative to the carrier 94 along the vertical first line in a discrete range. The carrier 94 has a U-shaped undercut 116 that is complementary in shape to the cross-sectional configuration of a thickness of the chuck component 84 that nests therein. A pin 118 extends through a portion 120 of a wall on the carrier 94 and into the chuck component 84 so that the wall portion 120 is loosely held captive between a head 122 on the pin 118 and the chuck component 84. The pin 118 is movable guidingly vertically within an elongate slot 124 through the wall portion 120 so that the chuck component 84 can float vertically within a discrete range determined by the length L of the slot 124.

A graspable handle 126 is connected to the carrier 94 and can be manually manipulated to move the carrier 94 relative to the base 82 to change the chuck component 84 between running and lockout positions. In this embodiment, the graspable handle 126 is in the form of a shaped, elongate bar projecting in cantilever fashion from the carrier 94. A graspable portion is formed as a loop 128 at the end of an elongate arm 130. The arm 130 is formed so that the loop 122 is situated so as not to obstruct operation of the roll stand assembly 10, yet is readily accessible when it is required to be engaged.

By grasping the handle 126 and drawing the chuck component in the direction of the arrow 132 in FIG. 14, from its running position towards its lockout position, the end 92 can be situated in adjacent confronting relationship with the shaft assembly 52 with the opposite end 90 situated in adjacent, confronting relationship with the shaft assembly 42 on the roll 12. So long as this relationship is maintained, the chuck component 84 acts as a positive wedge that prohibits the portions of the shaft assemblies 42, 52 at the ends 90, 92 from moving closer to each other than the length of the chuck component 94 between its ends 90, 92, as to close the gap G between the sheet engaging surfaces 40, 48.

The length of the chuck component 84 is selected so that the chuck component 84 can be moved between the running and lockout positions without being blocked by the shaft assemblies 42, 52. Because the chuck component 94 can float vertically a short distance, the end 92 might engage the shaft assembly 52 and be cammed slightly upwardly to allow sufficient clearance to move horizontally fully to the lockout position. The chuck component 84 shifts downwardly under its weight to be suspended by the pin 118 preferably with the end 92 of the chuck component 84 spaced slightly above the shaft assembly 52 with the chuck component 84 in the lockout position. This avoids wear on the shaft assembly by the end 92. The end 90 is preferably spaced slightly below the shaft assembly 42 for the same reason.

The chuck component 84 is consistently releasably maintained in each of the lockout and running positions by separate latching arrangements that are part of a latching system. More particularly, the carrier body 96 has a squared, hollow housing 135 at its end within which separate latch components 136, 138 are mounted. The latch component 136 has a cantilevered part 140 that makes a releasable latched connection to a part 142 on a latch component 144 fixed to the base 82. The latch component parts 140, 142 snap connect as an incident of the chuck component 84 on the carrier 94 moving from its running position into its lockout position. The holding force of the latch components 136, 144 can be overcome by producing a predetermined force on the carrier 94, as through the handle 126. The latch components 136, 138 are designed so that this predetermined force is large enough to avoid inadvertent movement of the chuck component 84 from its lockout position, as under a minor impact force, but not large enough that it is difficult to change the chuck component 84 from the lockout position into the running position through manipulation of the handle 126.

The latch component 138 has a part 146 that cooperates with a part 148 on a latch component 150 in the same manner that the parts 140, 142 cooperate between the latch components 136, 144. The latch components 138, 150 releasably maintain the carrier 94 fixed with the chuck component 84 in the running position.

The safety assembly 30 additionally includes a disabling assembly, shown schematically at 154 in FIGS. 10 and 13. The disabling assembly 154 prevents one or both of the drives 54, 56 from operating so as to reposition the second roll 14 relative to the first roll 12 to thereby change the first and second rolls from their open relationship into their operating relationship. This disabling occurs as an incident of the chuck component 84 moving from its running position towards its lockout position.

More particularly, the disabling assembly 154 includes a switch assembly 156 that is supported on the base 82 and changeable between "on" and "off" states. As the chuck component 84 is moved into the running position, a projecting boss 158 on the housing 135 depresses an actuator 160 on the switch assembly 156, placing the same in the on state, wherein the disabling assembly 130 permits the drives 54, 56 to be operated in a normal manner. This state is shown FIG. 14.

As the carrier 94 translates to move the chuck component 84 away from its running position, the boss 158 separates from the switch assembly 132, as an incident of which the depressed actuator 160 extends under a restoring force so that the switch assembly 132 is changed into the off state. Through the disabling assembly 130 the drives 54, 56 are prohibited from operating. Thus, the safety assembly 30 has a redundant safety aspect by reason of both disabling the drives 54, 56 and acting as a physical barrier between the first and second rolls 12, 14 to prevent reduction of the open roll gap dimension.

In FIGS. 18-29, a modified form of roll stand assembly is shown at 10', incorporating a modified form of safety assembly 30' according to the invention, including safety assembly units 80'. A frame 16' supports corresponding first, second, and third rolls 12', 14', 32' between frame parts 44', 46'. The rolls 12', 14', 32' have shaft assemblies 42', 52', 54' that span between the frame parts 44', 46'. Variable gaps G3, G4 are defined respectively between the roll pairs 12', 14'; and 14', 32'.

In this embodiment, a chuck component 84' is pivoted between a running position, as shown in FIGS. 18, 19, and 22-24, and a lockout position, as shown in FIGS. 20, 21, 25, 27, and 28. More specifically, the chuck component 84' has cantilevered, diametrically oppositely projecting parts 162, 164 joined to a carrier 94' that is mounted to the shaft assembly 52' for pivoting relative thereto about the axis 36' thereof.

With the chuck component 84' in the running position, separate drives 166, 168 can be operated to move the rolls 12', 32' towards and away from the roll 14' to vary the dimension of the gaps G3, G4. As seen in FIG. 19, in its running position, the opposite ends 90', 92' of the chuck component 84' are located to reside relative to the shaft assemblies 42', 54' so that the rolls 12', 32' can be moved towards each other into an operating relationship.

By pivoting the chuck component 84' in the direction of the arrow 170 around the axis 36', the ends 90', 92' can be placed adjacent to nominally conforming parts of the shaft assemblies 42', 54'. In this position, the chuck component acts as a wedge between the shaft assemblies 42', 52', and 52', 54', thereby to maintain open gaps G3, G4 between the rolls 12', 14' and 14', 32'.

To confine pivoting movement of the chuck component 84', and consistently block the chuck component 84' in running and lockout positions, diametrically opposite, arcuate slots 172, 174 are formed in the carrier 94'. Separate pins 176 extend through each slot 172, 174 and into the frame 16'. As the carrier 94' pivots, the pins 176 simultaneously abut the ends of the respective slots 172, 174 with the chuck component 84' in each of its running and lockout positions.

A graspable handle 126' connects to the chuck component 84' and is usable as the aforementioned graspable handle 126 to pivot the chuck component 84' and carrier 94' to thereby change the chuck component 84' between the lockout and running positions therefor. The handle 126' has the same general configuration of handle 126, to include an elongate arm 130' and a loop 128' that can be grasped conveniently by the hand of a user.

The safety assembly 30' incorporates a latching system with latch components 136', 138', 144', 150' that function in the same manner as the correspondingly numbered latch components in the previously described embodiment. The only distinction lies in the fact that the latch components 136', 144' and 138', 150' interact as an incident of the chuck component 84' pivoting, as opposed to translating, between running and lockout positions. The latch components 138', 150' have cooperating parts 146', 148', with the latch components 136', 144' having cooperating parts (one shown at 140').

A switch assembly 156' has an associated actuator 160' that is depressed by a boss 158' as an incident of the chuck component 84' moving from the lockout position to the running position. The switch assembly 156' performs the same function as the switch assembly 156 in the earlier described embodiment in cooperating with a disabling assembly 154' for the drives 166, 168.

As with the chuck component 84, the chuck component 84' is movable within a limited range in a lengthwise direction relative to the carrier 94', as indicated by the double-headed arrow 178 in FIG. 22. The primary difference between the chuck components 84, 84' is that the former has only one movable part, whereas the latter has separate, like moving parts 162, 164.

The carrier 94' has a U-shaped undercut 116' that conforms to the cross-sectional shape of the part 162 of the chuck component 84'. Through this arrangement, the part 162 of the chuck component 84' is guided relative to the carrier 94' in the line of the double-headed arrow 178. The part 164 is similarly constructed to cooperate with the carrier 94' in like fashion.

The range of relative lengthwise movement between the parts 162, 164 of the chuck component 84' and the carrier 94' is established by a pair of pins 180 that extend through elongate slots 182 (one shown for part 162) of like construction at diametrically opposite locations relative to the pivot axis 36' for the carrier 94'.

As seen in FIGS. 25, 26, 28, and 29, for the exemplary pin and slot arrangement on the part 162, the pin 180 is fixed to the carrier 94'. A biasing element, shown in the form of a coil spring 184, is compressed between a wall 186 on the carrier 94' and a boss 188 on the chuck component 84'. The coil spring 184 is loaded so that the part 162 of the chuck component 84' and carrier 94' are urged to a relationship wherein the pins 180 are centered lengthwise within the slot 182, as shown in FIG. 29.

With this arrangement, as the chuck component 84' is pivoted from its running position into its lockout position, if there is contact between the chuck component 84' and either of the shaft assemblies 42', 54', the parts 162, 164 of the chuck component 84' will shift lengthwise to allow the chuck component 84' to fully realize the lockout position. Once this occurs, the coil springs 184 generate forces that re-center the pins 180 within their respective slots 182.

To avoid interference between the ends 90', 92', and the shaft assemblies 42', 54', the ends 90', 92' are contoured so as to eliminate sharp, right angle corners. The end 90' is also arcuately shaped to conform at least nominally to the associated shaft assembly 42' to which it is adjacent with the chuck component 84' in its lockout position. The end 92' is shown convexly curved so that it acts as a cam to urge the part 162 of the chuck component 84' lengthwise, if necessary, as the lockout position is approached.

Ideally, both ends 90', 92' are slightly spaced from their respective shaft assemblies 42', 54' so that there is no wear that is caused by the chuck component 84' bearing on the shaft assemblies 42', 54'.

As described above, the disabling assembly 154' acts as a redundant safeguard by making the drives 166, 168 inoperable once the lockout position for the chuck component 84' is realized.

The precise configuration of the roll stand assembly is not critical to the present invention. For example, as shown in FIGS. 30 and 31, the safety assembly can be used with a conventional J-stack arrangement, shown at 190 with three separate rolls 194, 196, 198. In FIG. 30, the rolls 194, 196, 198 are shown in their operating relationship. In FIG. 31, the rolls 194, 196, 198 are shown in spaced relationship. The safety assembly 30 can be used between the rolls 194, 196, with the length of the associated chuck component 84 (not shown in FIG. 31) aligned vertically to normally reposition downwardly under its own weight. Between the rolls 196, 198, the safety assembly 30' is utilized so that the chuck component 94' (not shown) can be shifted, to become centered, under the force of the springs 184 (not shown). In a typical J-stack arrangement, the rolls 196, 198 will be inclined at an angle α to vertical that is on the order of 45°.

Virtually an unlimited number of variations from the structure shown in the preferred embodiments are contemplated. For example, the chuck component 84', while shown as made up of two parts 162, 164, may be made as a single piece.

Further, the chuck components can act between any rolls on a roll stand assembly that are in spaced relationship to each other to define a mechanical wedge.

Figure 32:
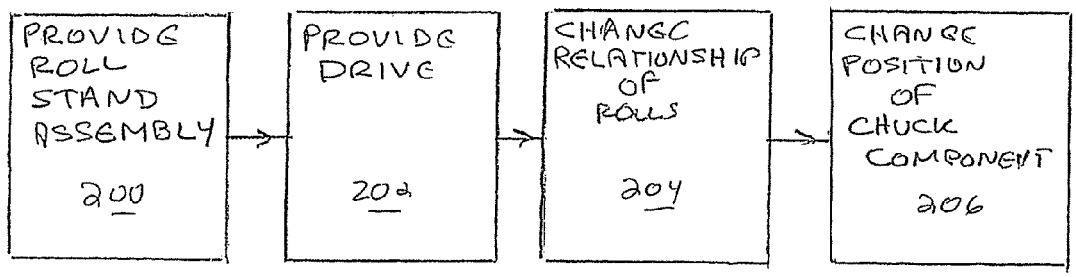
FIG. 32 is a flow diagram representation of a method of configuring a roll stand, according to the present invention.
Figure 4:
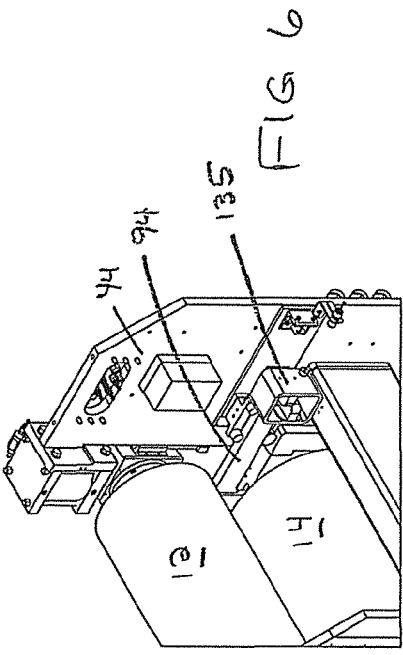
FIG. 4 is a fragmentary, perspective view of one safety assembly unit with a chuck component thereon in its running position.
Figure 6:
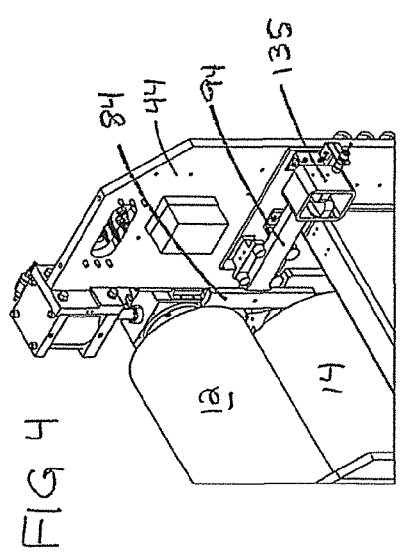
FIG. 6 is a view as in FIG. 4 wherein the chuck component on the safety assembly unit is in a lockout position.
Figure 5:
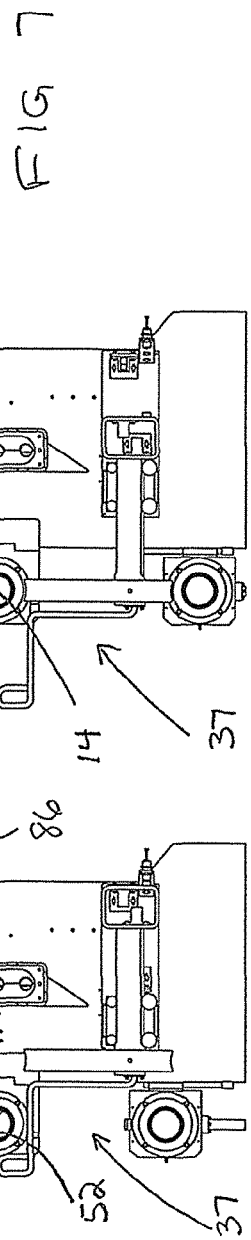
FIG. 5 is a side elevation view of the depicted portion of the roll stand assembly in FIG. 4, shown in partial cross-section, and with chuck components on separate safety assembly units in running positions.
Figure 7:
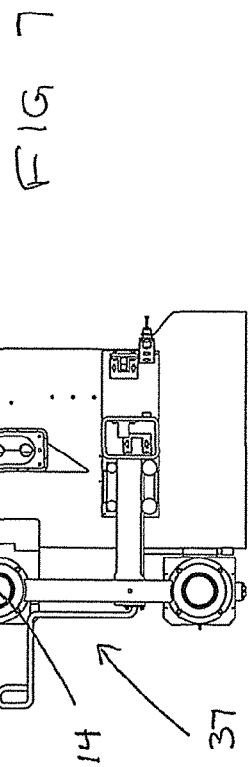
FIG. 7 is a view as in FIG. 5 wherein the chuck components on the safety assembly units are in lockout positions.
Figure 27:
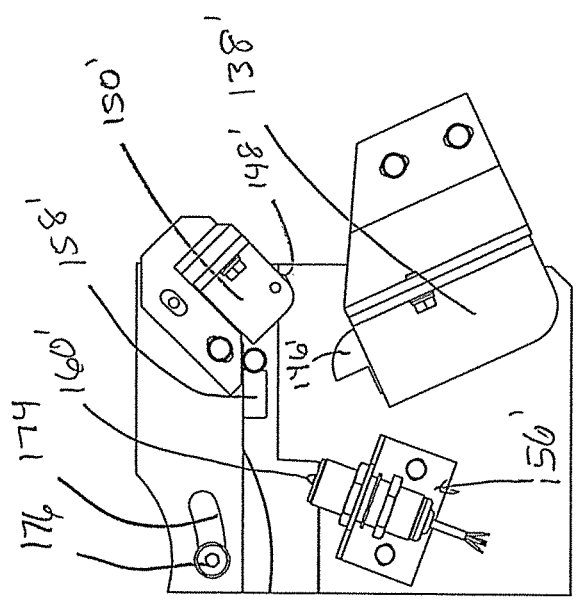
FIG. 27 is a view corresponding to that in FIG. 24 with the chuck component in the lockout position.
Figure 24:
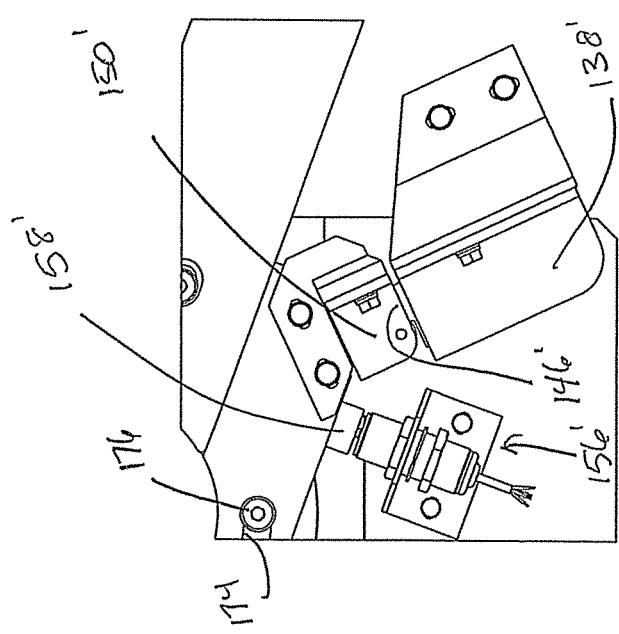
FIG. 24 is a further enlarged, fragmentary, side elevation view of a latching system on the safety assembly unit in FIG. 23 with the chuck component in the running position.

As shown in flow diagram form in FIG. 32, the invention is also directed to a method of configuring a roll stand. As shown at block 200, a roll stand assembly, as described above, is provided. As shown at block 202, a drive is provided on the roll stand assembly. As shown at block 204, through the drive, first and second rolls are changed from their operating relationship into their open relationship. As shown at block 206, with the first and second rolls in the open relationship, the first chuck component is changed from the running position into the lockout position.

The foregoing disclosure of specific embodiments is intended to be illustrative of the broad concepts comprehended by the invention.

The invention claimed is:

1. A roll stand assembly for processing a sheet product, the roll stand assembly comprising:
    a frame;
    a plurality of rolls on the frame and including first and second rolls respectively having first and second axes,
    the first and second axes substantially parallel with the first and second rolls operatively positioned on the frame,
    the first roll having a first sheet engaging surface and a first shaft assembly projecting axially from the first sheet engaging surface,
    the second roll having a second sheet engaging surface and a second shaft assembly projecting axially from the second sheet engaging surface,
    the first and second rolls relatively movable between: a) an operating relationship wherein there is a gap within a first dimensional range between the first and second sheet engaging surfaces with the roll stand assembly in an operative state; and b) an open relationship wherein the gap dimension is outside of the first dimensional range so as to permit access by an operator through the gap to between the first and second rolls; and
    a safety assembly that prevents inadvertent changing of the first and second rolls from the open relationship into the operating relationship,
    the safety assembly comprising a first chuck component mounted for movement relative to the frame between: a) a running position wherein the safety assembly is in a disengaged state and the first and second rolls can be relatively repositioned from the open relationship into the operating relationship; and b) a lockout position wherein the safety assembly is in an engaged state and the first chuck component resides between parts of the first and second rolls and prevents relative movement between the first and second rolls in a manner that would allow the first and second rolls to be changed from the open relationship into the operating relationship.

2. The roll stand assembly according to claim 1 wherein the first chuck component resides between parts of the first and second shaft assemblies.

3. The roll stand assembly according to claim 2 wherein the first chuck component is translated relative to the frame in a substantially straight line as the first chuck component is changed between the running and lockout positions.

4. The roll stand assembly according to claim 2 wherein the first chuck component is pivoted relative to the frame as the first chuck component is changed between the running and lockout positions.

5. The roll stand assembly according to claim 2 wherein the first chuck component is in the form of an elongate, generally flat bar with a length and first and second ends spaced in a lengthwise direction, the first and second ends located respectively at or adjacent the first and second shaft assemblies with the first chuck component in the lockout position.

6. The roll stand assembly according to claim 2 wherein the roll stand assembly comprises a drive for changing the first and second rolls between the operating and open relationship and the safety assembly comprises a disabling assembly for preventing the drive from changing the first and second rolls from the open relationship into the operating relationship as an incident of the first chuck component being moved from the running position toward the lockout position.

7. The roll stand assembly according to claim 6 wherein the disabling assembly comprises a switch assembly that is changeable between on and off states, the switch assembly changeable from the off state into the on state as an incident of the first chuck component moving from the lockout position into the running position to thereby allow the drive to change the first and second rolls from the open relationship into the operating relationship, the switch assembly changeable from the on state into the off state as an incident of the first chuck component moving from the running position towards the lockout position to thereby prevent the drive from changing the first and second rolls from the open relationship into the operating relationship.

8. The roll stand assembly according to claim 7 wherein the first chuck component has a length and first and second ends spaced in a lengthwise direction along a first line, the first and second ends located respectively at or adjacent the first and second shaft assemblies with the first chuck component in the lockout position.

9. The roll stand assembly according to claim 8 wherein the first chuck component is movable relative to the carrier along the first line in a discrete range.

10. The roll stand assembly according to claim 8 wherein the first end of the first chuck component has an arcuate surface to engage a complementarily-shaped surface on one of the first and second shaft assemblies with the first chuck component in the lockout position.

11. The roll stand assembly according to claim 2 wherein the safety assembly comprises a first base on the frame and a first carrier that is movable guidingly relative to the first base to change the first chuck component between the running and lockout positions.

12. The roll stand assembly according to claim 11 wherein the first carrier is movable in a substantially linear path guidingly relative to the first base as the first chuck component is changed between the running and lockout positions.

13. The roll stand assembly according to claim 11 wherein the safety assembly further comprises a graspable handle on the carrier through which the carrier can be manually moved relative to the base to change the first chuck component between the running and lockout positions.

14. The roll stand assembly according to claim 13 wherein the graspable handle is provided on an elongate arm that projects in cantilever fashion from the carrier.

15. The roll stand assembly according to claim 2 wherein the substantially linear path of the first carrier is substantially orthogonal to the first line.

16. The roll stand assembly according to claim 2 wherein the safety assembly comprises a carrier that is mounted to one of the shaft assemblies and pivots about an axis that is parallel to the axis of the one of the shaft assemblies as the first chuck component is changed between the running and lockout positions, the first chuck component mounted to the carrier.

17. The roll stand assembly according to claim 16 wherein the first chuck component comprises first and second parts together having a length between first and second spaced ends that respectively reside at or adjacent the first and second shaft assemblies with the first chuck component in the lockout position.

18. The roll stand assembly according to claim 2 wherein the plurality of rolls comprises a third roll with a third axis and a third sheet engaging surface, the second and third rolls relatively movable between: a) an operating relationship wherein there is a second gap within a second dimensional range between the second and third sheet-engaging surfaces with the roll stand assembly in an operative state; and b) an open relationship wherein the second gap dimension is outside of the second dimensional range so as to permit access through the second gap to between the second and third rolls, and there is a second chuck component that cooperates between the second and third rolls in substantially the same manner that the first chuck component cooperates between the first and second rolls.

19. The roll stand assembly according to claim 2 wherein the frame comprises first and second parts between which the first and second rolls span and upon which the first and second rolls are supported and the first chuck component is mounted to one of the first and second frame parts.

20. The roll stand assembly according to claim 19 wherein there is a second chuck component on the other of the first and second frame parts that cooperates with the first and second rolls in substantially the same manner that the first chuck component cooperates between the first and second rolls.

21. The roll stand assembly according to claim 20 wherein the safety assembly comprises cooperating latch components that releasably maintain the first chuck component in the lockout position.

22. The roll stand assembly according to claim 1 wherein the safety assembly comprises cooperating latch components that releasably maintain the first chuck component in the running position.

23. A method of configuring a roll stand, the method comprising the steps of:
providing a roll stand assembly as in claim 1;
providing a drive on the roll stand assembly;
through the drive, changing the first and second rolls from the operating relationship into the open relationship; and
with the first and second rolls in the open relationship changing the first chuck component from the running position into the lockout position.

24. The method of configuring a roll stand assembly according to claim 23 wherein the step of changing the position of the first chuck component comprises manually changing the position of the first chuck component and as an incident thereof disabling the drive.

* * * * *